United States Patent [19]
Weisang et al.

[11] 3,974,097
[45] Aug. 10, 1976

[54] CATALYSTS FOR THE HYDRO-TREATMENT OF HYDROCARBONS AND PROCESS OF PREPARING SUCH CATALYSTS

[75] Inventors: Joseph Edouard Weisang; Philippe Engelhard, both of Le Havre, France

[73] Assignee: Compagnie Francaise de Raffinage, Paris, France

[22] Filed: Nov. 20, 1974

[21] Appl. No.: 525,675

[30] Foreign Application Priority Data
Nov. 23, 1973 France .............................. 73.41827

[52] U.S. Cl. .............................. 252/440; 208/139; 252/441; 260/466
[51] Int. Cl.² ..................... B01J 23/62; C10G 35/08
[58] Field of Search .................. 252/441, 466 PT, 440

[56] References Cited
UNITED STATES PATENTS

| | | | |
|---|---|---|---|
| 2,957,819 | 10/1960 | Haensel | 252/466 PT |
| 3,002,920 | 10/1961 | Porter et al. | 252/466 PT |
| 3,700,588 | 10/1972 | Weisang et al. | 208/139 |
| 3,806,446 | 4/1974 | Hayes | 252/466 PT |
| 3,909,452 | 9/1975 | Acres | 252/466 PT |

FOREIGN PATENTS OR APPLICATIONS

| | | | |
|---|---|---|---|
| 2,089,389 | 7/1972 | France | 208/139 |

*Primary Examiner*—Herbert Levine
*Attorney, Agent, or Firm*—Curtis, Morris & Safford

[57] ABSTRACT

A catalyst useful for the hydro-treatment of hydrocarbons comprising, on a refractory inorganic oxide support, the following metals:
  a. from 0.02 to 2% of at least one platinum metal;
  b. from 0.02 to 2% of at least one metal belonging to the group consisting of zirconium, titanium, and tungsten;
  c. from 0.02 to 2% tin.

This catalyst is preferably halogenated, typically with chlorine, from 0.4 to 2%.

7 Claims, No Drawings

CATALYSTS FOR THE HYDRO-TREATMENT OF HYDROCARBONS AND PROCESS OF PREPARING SUCH CATALYSTS

The present invention relates to catalysts intended for the hydro-treatment of hydrocarbons, and more particularly to petroleum cuts whose distillation range corresponds to that of gasolines and naphtha. It also concerns a process of preparing such catalysts.

By catalytic hydro-treatment processes are meant processes applied to hydrocarbon charges in the presence of hydrogen and which employ hydrogenation - dehydrogenation, isomerization, cyclization, dehydrocyclization and aromatization reactions. These reactions may exist simultaneously, as in the case of the hydroreforming of naphtha; however, depending on the nature of the charge, the reaction conditions, and the nature of the catalyst, one of these reactions may be preponderant, for instance the hydro-isomerization.

The great current development of processes for the catalytic hydro-treatment of hydrocarbons is known. It is due on the one hand to the necessity of the refineries to have a source of gasoline of very high octane number which is used either directly or, more generally, after mixing with a petroleum cut having a similar boiling range but of lower octane number, and on the other hand the necessity to have a source of aromatic hydrocarbons in petrochemical plants, since they are important raw materials of the plastics industry.

The metals of group VIII of the periodic table of elements, and particularly platinum, deposited on an acid or slightly acid refractory inorganic oxide, are extensively used as hydro-treatment catalysts.

It is known that in order to increase the octane number of the resultant efflux and the output of liquid, particularly the output of aromatic hydrocarbons without having to increase the platinum content substantially, one has been led to use bimetallic and trimetallic catalysts, among which, mention may be made by way of example, of:

(Pt - Sn), (Pt - Pb), (Pt - Ge), (Pt - Re), (Pt - Ir), (Pt - Au), (Pt - Cu), (Pt - Sn - Re), (Pt - Sn - Ir), (Pt - Sn - Ge), (Pt - Pb - Re), (Pt - Ge - Re), (Pt - Re - Ir).

The addition of different metals makes it possible to obtain hydro-treatment catalysts which are of great interest.

The purpose of the present invention is therefore to obtain catalysts for the hydro-treatment of hydrocarbons which impart to the efflux a better octane number and assure a higher yield of liquid than that obtained when using a catalyst which comprise only platinum or a platinum metal deposited on a refractory inorganic oxide.

In the present description, the expression "platinum metal" designates one of the following metals:
ruthenium
rhodium
palladium
osmium
iridium
platinum.

A preferred embodiment of the present invention is a catalyst comprising a support of a refractory inorganic oxide and admitting of a halogen element present in combined form, the said catalysts being characterized by the fact that it comprises the following metals in free or combined state:

a. 0.02 to 2% and preferably 0.10 to 0.70%, referred to the total weight of the catalyst, of at least one platinum metal;
b. 0.02 to 2% and preferably 0.02 to 0.60%, referred to the total weight of the catalyst, of at least one metal of the group consisting of tungsten, zirconium and titanium;
c. 0.02 to 2% and preferably 0.05 to 1,00%, referred to the total weight of the catalyst, of tin.

The invention concerns more particularly the catalysts defined above and in which:

d. the said support has a specific surface of more than 15 $m^2/g$ and a specific pore volume of more than 0.1 $cm^3/g$;
e. the halogen content is between 0.4 and 2%, and preferably 0.5 to 1.6%, referred to the total weight of the catalyst.

Another embodiment of the present invention is a process of preparing the hydro-treatment catalysts defined above, this process being of the type comprising at least one impregnation of the porous support with as least one solution containing at least one of the elements to be deposited, said process being characterized by the fact that at least one of the impregnation solutions contains either cations formed from the elements tungsten and/or titanium and/or zirconium or anions containing the elements tungsten and/or titanium and/or zirconium.

Another embodiment of the present invention relates to an improvement in the process of preparation described above, consisting of subjecting the catalysts, prior to use, to reduction and possibly presulfation.

Finally, a further embodiment of the invention concerns the application of the above-defined catalysts to the reforming of a charge of hydrocarbons.

The catalyst supports in accordance with the invention are the refractory substances customarily used for hydro-treatment catalysts. They have a sufficient specific surface and specific pore volume, the specific surface being preferably between 15 and 350 $m^2/g$ and the specific pore volume greater than 0.1 $cm^3/g$. These products should furthermore be of an acid or slightly acid character, such as alumina for instance. Aluminosilicates are also suitable.

The catalysts can be prepared by processes of impregnating the support with solutions containing the elements to be deposited. The applicants have found that it is advantageous to effect the depositing of the platinum last, after having effected the depositing of tungsten and/or of titanium and/or of zirconium; this first deposit being capable of being effected before, during, or after the deposit of tin.

The most advantageous catalysts are those whose contents of platinum metals, of metals of the group consisting of zirconium, tungsten and titanium, and of tin are between 0.02 and 2% and preferably 0.10 to 0.70%; **0.02 to 2% and preferably 0.02 to 0.60%; and 0.02 to 2% and preferably 0.05 to to 1.00%; respectively.

The content of platinum metal is that customarily employed in multi-metallic catalysts for the hydro-treatment of hydrocarbons. In order to obtain satisfactory catalytic properties, the content of this type of metal is preferably greater than 0.10% but, for reasons of the cost of the catalyst, the said content is in general limited to 0.70%.

Likewise, the content of metal of the group consisting of zirconium, titanium and tungsten is between 0.02 and 2%. Below 0.02%, the improvement in the properties of the ordinary catalyst, comprising only one metal such as platinum deposited on a porous support, is not substantial, and it is not of interest either to exceed 2%. The applicants have furthermore observed that the most effective contents are those which are between 0.02 to 0.60%; since, above 0.60%, the increase in the cost of the catalyst is not compensated for by a sufficiently substantial improvement in the catalytic properties.

The same is also true of the tin. The content of this metal may vary between 0.02 and 2%; however, a content of 0.05 to 1% is advantageous, for the same reasons as those set forth above.

The halogen content of the catalyst is well-known in the art. It may vary between 0.4 and 2%, but the best results are obtained with halogen contents of 0.5 to 1.6%, chlorine being the preferred halogen; these quantities are calculated as if said halogen was in an elemental form; in fact it may be combined with the support and/or with the elements deposited on the support.

The acidity of the support may be modified, prior to the depositing of the elements or between the deposits when the latter are not simultaneous. The support on which the zirconium and/or the titanium and/or the tungsten and the tin have been deposited can be subjected in particular to a treatment with an acid, hydrochloric acid for instance, before depositing the platinum. This treatment will be described below in connection with the examples.

The applicants have observed that in the impregnation solution containing the elements titanium and/or zirconium and/or tungsten and in the impregnation solution containing the tin, these elements may be in different states. Thus they may be in the state of cations having a stable degree of oxidation under the operating conditions and medium; for example, $W^{6+}$, $Ti^{4+}$, $Zr^{4+}$, $ZrO^{2+}$, $Sn^{2+}$, $Sn^{4+}$. They may also be part of the constitution of anions, for example $WO_4^{2-}$, $TiO_4^{4-}$, $Zr_2O_7^{4-}$. The halogen present in the catalyst in accordance with the invention will generally be chlorine, in combined form; the combinations of the halogen may be with the support and/or with the elements deposited on the support.

Furthermore, the applicants have observed that a treatment of the catalyst prior to its use, said treatment consisting in effecting a reduction at about 500°C — as in the case of most hydrocarbon hydro-treatment catalysts — and a presulfating of the catalyst, which presulfating may be effected at about 370°C by hydrogen sulfide diluted in hydrogen, for instance; substantially improves the stability with time of the catalytic properties. This treatment, on an industrial plane, is of great interest since it has the effect of lengthening the period of use of the catalyst without having to regenerate it by the means known in the art.

The present invention is illustrated by the following examples, which are given solely by way of illustration. Example I concerns the hydroreforming of normal heptane. This particular charge does not constitute a limitation on the scope of use of the catalysts in accordance with the invention, but they can be used successfully for the hydroreforming of a charge of hydrocarbons whose boiling point is between 35 and 250°C and whose sulfur content is less than 10 ppm and, if possible, 1 ppm. Example II concerns the aromatization of normal hexane. Like the normal heptane in the case of the hydroreforming, this particular charge is not limitative. As can be seen from Example III, the catalysts may be successfully used for the aromatizing of petroleum cuts comprising, primarily, molecules having six or seven carbon atoms in particular.

In all the examples, unless otherwise indicated, the compositions of the catalysts are expressed in % by weight of the catalyst.

EXAMPLE I

An alumina is used in the form of extrudates, having the following characteristics:

| | |
|---|---|
| average diameter of the extrudates: | 1.5 mm |
| specific surface | 190 m²/g |
| pore volume | 0.51 cm³/g |
| average radius of the pores | 53 A |
| chlorine content (measured by X fluorescence) | 0.5% by weight of the alumina |

This alumina is calcined for four hours at 600°C. It will constitute the support for the catalysts prepared and tested in the present example. This example comprises the preparation of a control catalyst. TO and nine catalysts I to IX.

PREPARATION OF THE FIRST CONTROL CATALYST TO 100 g of the above alumina are immersed in 250 cc of an 0.1 N solution of hydrochloric acid. The alumina is then contacted with a circulating solution of hexachloroplatinic acid whose initial platinum content is such that the final catalyst contains 0.35% to 0.40% platinum.

After draining and then drying at 100°C, the solid is calcined at 530°C in a muffle furnace. The catalyst thus contains 0.35% platinum and 1.37% chlorine.

PREPARATION OF THE CONTROL CATALYSTS T1, T2, T3, T4

100 g of the support alumina are immersed in 125 cc of solution containing 10 cc of hydrochloric acid RP. There are then added 125 cc of a second solution also containing 10 cc of hydrochloric acid RP and a given quantity of compound of the metal which it is desired to deposit, in such a manner as to obtain the desired contents in the final catalyst. The particles of alumina are drained, dried at about 100°C, and then calcined at 600°C in a muffle furnace. The calcining temperature should be preferably above 500°C. The solid obtained is then treated with 250 cc of an 0.1 N hydrochloric acid solution and then contacted with a solution of hexachloroplatinic acid whose initial platinum concentration is such that the final catalyst still contains about 0.35% platinum. After draining and then drying at about 100°C the solid is calcined at 530°C in a muffle furnace. The different compositions of the catalysts obtained are set forth in Table I.

PREPARATION OF CATALYSTS I, II, III

The catalysts I (Pt-Sn-Ti), II (Pt-Sn-W) and III (Pt-Sn-Zn) are prepared in a manner similar to catalysts T1, T2, T3. The only difference in the precedent manner of operation is that tin is also deposited on the support, and impregnation solution containing tin being mixed with the impregnation solution containing the titanium, the zirconium or the tungsten. The depositing takes place therefore simultaneously in this case.

All the other operations are the same. The compositions of the catalysts prepared in this manner are given in Table I.

TABLE I

| Catalyst | Metal compound used in the first impregnation solution | % Pt | % Cl | % Sn | % Ti | % W | % Zr |
|---|---|---|---|---|---|---|---|
| T0 |  | 0.35 | 1.37 |  |  |  |  |
| T1 | Ti oxalate | 0.35 | 1.39 |  | 0.09 |  |  |
| I | Ti oxalate + stannous chloride | 0.38 | 1.29 | 0.20 | 0.30 |  |  |
| T2 | Ammonium paratungstate | 0.35 | 1.05 |  |  | 0.28 |  |
| II | Ammonium paratungstate and stannous chloride | 0.38 | 1.29 | 0.20 |  | 0.27 |  |
| T3 | Zirconyl nitrate | 0.35 | 0.98 |  |  |  | 0.15 |
| III | Zirconyl nitrate + stannous chloride | 0.36 | 1.28 | 0.20 |  |  | 0.18 |
| T4 | Stannous chloride | 0.37 | 0.86 | 0.21 |  |  |  |

Catalytic tests described below are then carried out: 25 cc of catalyst are placed in a stainless steel reactor, a stream of pure dry hydrogen is passed over the catalyst for 2 hours, the temperature of the catalyst being maintained close to 500°C and the pressure in the reactor being maintained at 7 bars. Thereupon, the temperature is brought to about 510°C and the charge consisting of normal heptane is introduced with a liquid hourly space velocity of 2, and a ratio of the number of hydrogen moles introduced, to the number of normal heptane moles introduced, of 5.

Samples taken from the effluent of the reactor make it possible to determine, on the one hand, the liquid output by simple weighing and, on the other hand, the equivalent octane number of the liquid by application to the chromatographic analyses of the liquid of the ASTM mixture numbers appearing on normographs.

The tests are carried out with a fixed octane number, that is to say as soon as a decrease in the octane number is noted the temperature of the reactor is increased so as to obtain again the octane number originally selected. The variation of the temperature as a function of time is very substantially assimilatable to a straight line, the slope of which is measured, the smaller the slope of this line the better the catalyst, since it is then sufficient to modify the temperature only very slightly in the course of time in order to obtain the desired octane number. The limit temperature of use is therefore reached more slowly and the duration of the cycle of use is lengthened, which is an undeniable advantage at the industrial level.

In Table II the results of the tests thus carried out are indicated for three initially selected octane numbers for the catalysts included in Table I.

TABLE II

| Test Catalyst | Octane number selected | Initial Temp. (°C) | Slope of the T = f (time) | Average Yield |
|---|---|---|---|---|
| T0 | 98 | 495 | 0.333 | 55.7 |
|  | 103 | 499 | 0.343 | 61.0 |
|  | 108 | 507 | 0.310 | 55.8 |
| T1 | 98 | 505 | 0.175 | 60.7 |
|  | 103 | 505 | 0.145 | 60.2 |
|  | 108 | 507 | 0.224 | 58.8 |
| I | 98 | 502 | 0.071 | 63.3 |
|  | 103 | 504 | 0.155 | 63.15 |
|  | 108 | 514 | 0.133 | 62.0 |
| T2 | 98 | 507 | 0.125 | 57.8 |
|  | 103 | 506 | 0.083 | 58.1 |
|  | 108 | 507 | 0.252 | 56.7 |
| II | 98 | 504 | 0.075 | 59.2 |
|  | 103 | 509 | 0.116 | 63.0 |
|  | 108 | 520 | 0.150 | 59.0 |
| T3 | 98 | 504 | 0.087 | 61.3 |
|  | 103 | 506 | 0.138 | 61.3 |
|  | 108 | 512 | 0.264 | 53.4 |
| III | 98 | 500 | 0.055 | 62.0 |
|  | 103 | 507 | 0.058 | 59.9 |
|  | 108 | 510 | 0.127 | 58.5 |
| T4 | 98 | 503 | 0.134 | 61.35 |
|  | 103 | 513 | 0.164 | 61.0 |
|  | 108 | 515 | 0.205 | 60.05 |

From this table it is seen that the trimetallic catalysts I, II and III are as a whole better than the bimetallic catalysts T1, T2, T3 or T4 and the monometallic catalyst T0. In particular, it is noted that they are more stable for average yields obtained, which are at least equivalent in most of the cases.

EXAMPLE II

This example illustrates the use of the catalysts in accordance with the invention for a specific chemical reaction occurring already in reforming, as mentioned in the specification, namely aromatization.

For this purpose 3 catalysts of the type of the invention were prepared. Three formulas are involved here, comprising platinum, tin, and zirconium or tungsten or titanium deposited on an alumina identical to the support of Example I by a method of impregnation similar to that described in the preceding example.

The catalysts thus prepared contain:

catalyst IV: 0.35% Pt; 0.20% Sn; 0.20% Zr; 1.13% Cl.
catalyst V: 0.37% Pt; 0.20% Sn; 0.13% Ti; 1.19% Cl.
catalyst VI: 0.36% Pt; 0.19% Sn; 0.23% W; 1.26% Cl.

With these three catalysts tests are carried out under atmospheric pressure at 520°C with normal hexane (which is transformed into benzene by aromatization) and hydrogen, the latter being introduced with the normal hexane in the ratio:

$$\frac{hydrogen}{normal\ hexane} = 15.9$$

It is found that with the above three catalysts the conversion is practically complete, the benzene selectivity being 60.8 for catalyst IV, 68.4 for catalyst V, 64.6 for catalyst VI.

This shows that the catalysts of the invention are good aromatization catalyst.

EXAMPLE III

This example illustrates the use of a catalyst in accordance with the invention in an aromatization process carried out under pressure.

The catalyst employed contains:
- 0.35% by weight platinum (deposited by a solution of hexachloroplatinic acid)
- 0.21% by weight tin (deposited by a solution of stannous chloride)
- 0.16% by weight zirconium (deposited by a solution of zirconyl nitrate)
- 0.84% by weight chlorine.

In order to test the catalysts prepared in this manner for the aromatization reaction, there are employed two charges; the analysis of which is given in Table III.

TABLE III

| Componants | Charge A (% by weight) | Charge B (% by weight) |
|---|---|---|
| iso-hexanes | 22.0 | 19.85 |
| normal-hexane | 27.8 | 25.0 |
| iso-heptanes | — | — |
| normal-heptane | — | — |
| methyl-cyclopentane | 23.8 | 28.3 |
| cyclohexane | 16.1 | 16.65 |
| benzene | 10.3 | 10.8 |
| paraffins (P) | 49.8 | 44.85 |
| napthenes (N) | 39.9 | 45.0 |
| aromatics (A) | 10.3 | 10.8 |

The aromatization reaction is carried out in a manner identical to the hydroreforming tests described in Example I, with the following conditions:

| | |
|---|---|
| pressure | 10 bars |
| molar ratio hydrogen/hydrocarbons | 5 |
| hourly space velocity | 2 |
| temperature | 520°C |

The results of the tests carried out in this manner are as follows:

1. for charge A it is noted that the conversion of the paraffins and of the naphthenes is equal to 94.1% and the aromatic selectivity is equal to 45.8%.

2. for charge B, the conversion of (P+N) is equal to 92.4%, the aromatic selectivity being here equal to 53.8%.

This test under pressure confirms therefore that the catalysts in accordance with the invention are very good aromatization catalysts.

For the purpose of simplifying the body of the description of the invention, mention has been made mainly of one of the platinum metals; however, the combinations, within the limits of the quantities indicated do function in the indicated manner and are consequently within the scope of the invention.

We claim:

1. In a process for manufacturing a hydro-treatment catalyst having a porous refractory inorganic oxide support with a specific surface between 15 and 350m$^2$/g, with a specific pore volume greater than 0.1cm$^3$/g and with at least a slightly acid character, incorporating onto said support a halogen in combined form between 0.4 and 2% and the following metals:
    a. about 0.02 to 2% of at least one platinum metal,
    b. about 0.02 to 2% of at least a second metal;
    c. about 0.02 to 2% of tin,
said weight percentages being based on the total weight of the catalyst,
and comprising at least one impregnation of the support by at least one solution containing at least one of said second metal, a platinum metal, and tin,
the improvement wherein said second metal is titanium and the incorporation of said metals onto said support comprises at least one of the impregnation solutions contains either cations or anions containing titanium.

2. A process according to claim 1, wherein any depositing of titanium and tin is effected before the depositing of any of the platinum metals.

3. A process according to claim 2, wherein all the metals of the catalyst are impregnated onto the support by deposit from solution and, before the depositing of any platinum metals and after the depositing of any of the other metals, the support is treated with a solution of hydrochloric acid.

4. A process according to claim 3, comprising furthermore after the depositing of the metals on the support by impregnation, drying of the catalyst at about 100°C and calcining at about 500°C, and reduction by hydrogen.

5. A process according ro claim 4, further comprising after calcining a presulfating of the catalyst.

6. A process according to claim 5, wherein the reduction and the presulfating are effected simultaneously.

7. A process according to claim 1, wherein the catalyst support is alumina and the platinum metal is specifically platinum.

* * * * *